United States Patent
Bonne et al.

(10) Patent No.: US 6,681,623 B2
(45) Date of Patent: Jan. 27, 2004

(54) FLOW AND PRESSURE SENSOR FOR HARSH FLUIDS

(75) Inventors: Ulrich Bonne, Hopkins, MN (US); Jamie Speldrich, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 225 days.

(21) Appl. No.: 10/011,932

(22) Filed: Oct. 30, 2001

(65) Prior Publication Data

US 2003/0079542 A1 May 1, 2003

(51) Int. Cl.$^7$ ................................................ G01F 1/68
(52) U.S. Cl. ........................................................ 73/202
(58) Field of Search .............................. 73/202, 202.5, 73/203, 706, 861.52–861.64

(56) References Cited

U.S. PATENT DOCUMENTS

| | | | | |
|---|---|---|---|---|
| 3,956,937 A | * | 5/1976 | Lawford et al. ............... 73/706 |
| 4,058,015 A | * | 11/1977 | Stode .......................... 73/706 |
| 4,343,768 A | | 8/1982 | Kimura ........................ 422/97 |
| 4,472,239 A | | 9/1984 | Johnson et al. ............... 156/647 |
| 4,478,076 A | | 10/1984 | Bohrer ........................ 73/204 |
| 4,478,077 A | | 10/1984 | Bohrer et al. ................. 73/204 |
| 4,501,144 A | | 2/1985 | Higashi et al. ............... 73/204 |
| 4,548,078 A | | 10/1985 | Bohrer et al. ................. 73/204 |
| 4,555,939 A | | 12/1985 | Bohrer et al. ................. 73/198 |
| 4,566,320 A | | 1/1986 | Bohrer ........................ 73/204 |
| 4,571,608 A | | 2/1986 | Johnson ........................ 357/28 |
| 4,581,928 A | | 4/1986 | Johnson ....................... 73/204 |
| 4,587,105 A | | 5/1986 | Bonne et al. .................. 422/98 |
| 4,624,137 A | | 11/1986 | Johnson et al. ................. 73/204 |
| 4,651,564 A | | 3/1987 | Johnson et al. ................. 73/204 |
| 4,682,503 A | | 7/1987 | Higashi et al. ................. 73/755 |
| 4,683,159 A | | 7/1987 | Bohrer et al. ................. 428/138 |
| 4,696,188 A | | 9/1987 | Higashi ........................ 73/204 |
| 4,706,061 A | | 11/1987 | Johnson ........................ 338/34 |
| 4,708,636 A | | 11/1987 | Johnson ........................ 431/20 |
| 4,739,657 A | | 4/1988 | Higashi et al. ................. 73/204 |
| 4,794,048 A | | 12/1988 | Oboodi et al. ................. 428/432 |
| 4,825,693 A | | 5/1989 | Bohrer et al. ................. 73/204.25 |
| 4,829,818 A | | 5/1989 | Bohrer ........................ 73/204.22 |
| 4,856,328 A | | 8/1989 | Johnson ........................ 73/202 |
| 4,867,842 A | | 9/1989 | Bohrer et al. ................. 156/647 |
| 4,885,938 A | | 12/1989 | Higashi ....................... 73/204.18 |
| 4,891,977 A | | 1/1990 | Johnson et al. ............... 73/204.26 |
| 4,895,616 A | | 1/1990 | Higashi et al. ............... 156/647 |
| 4,914,742 A | | 4/1990 | Higashi et al. ................. 357/26 |
| 4,914,947 A | | 4/1990 | Davidson ..................... 73/202.5 |
| 4,959,990 A | * | 10/1990 | Morris ........................ 73/202 |
| 4,966,037 A | | 10/1990 | Sumner et al. ............... 73/204.26 |
| 5,410,916 A | | 5/1995 | Cook .......................... 73/706 |
| 5,462,525 A | | 10/1995 | Srisathapat et al. ............. 67/604 |

(List continued on next page.)

FOREIGN PATENT DOCUMENTS

| | | | | |
|---|---|---|---|---|
| WO | WO 01/07903 A2 | 2/2001 | .......... G01N/27/00 |
| WO | WO 01/11322 A1 | 2/2001 | ........... G01F/1/684 |

*Primary Examiner*—Robert Raevis
(74) *Attorney, Agent, or Firm*—Kris T. Fredrick; Kermit D. Lopez; Luis M. Ortiz (57) ABSTRACT

Methods and systems for preventing degradation of a sensor exposed to a harsh fluid, such as one that might corrode or be exposed to radioactive contaminants, live pathogens, freezing temperatures, overheating, particle deposition or condensable vapors is disclosed. An auxiliary purge stream of comparatively clean fluid or purge fluid is utilized, which flows past the sensor in opposition to the harsh fluid, thereby preventing the harsh fluid from contacting and degrading the sensor. The clean fluid itself may comprise a purge gas, such as clean, dry air, or a liquid that is compatible with the composition of the harsh fluid. The flow and pressure of the clean fluid can be adjusted utilizing one or more supply regulator valves.

22 Claims, 5 Drawing Sheets

U.S. PATENT DOCUMENTS

| | | | |
|---|---|---|---|
| 5,684,253 A | 11/1997 | Bonne et al. | 73/706 |
| 5,755,218 A | 5/1998 | Johansson et al. | 128/200.14 |
| 5,852,239 A | 12/1998 | Sato et al. | 73/204.26 |
| 5,852,247 A | 12/1998 | Batey | 73/861.17 |
| 5,869,749 A | 2/1999 | Bonne et al. | 73/53.01 |
| 5,886,249 A | 3/1999 | Bonne et al. | 73/24.02 |
| 5,965,812 A | 10/1999 | Manaka | 73/204.26 |
| 6,023,969 A | 2/2000 | Feller | 73/204.25 |
| 6,105,575 A | 8/2000 | Estes et al. | 128/204.23 |
| 6,112,591 A | 9/2000 | Manaka | 73/204.26 |
| 6,169,965 B1 | 1/2001 | Kubisiak et al. | 702/136 |
| 6,184,773 B1 | 2/2001 | Bonne et al. | 338/25 |
| 6,223,593 B1 | 5/2001 | Kubisiak et al. | 73/204.15 |

\* cited by examiner

FLOW AND PRESSURE SENSOR FOR HARSH FLUIDS

TECHNICAL FIELD

The present invention relates generally to sensors utilized to detect the quality of fluids, including gas and liquid. The invention also relates to thermal sensors of such fluids, such as fluid flow or property sensors implemented on silicon in microstructure form. The present invention additionally relates to differential pressure sensors utilized in association with flow sensors. The present invention specifically relates to techniques and systems thereof for preventing contamination of such sensors which may come into contact with harsh gases or liquids that can corrode, contaminate with radioactive or live pathogens, freeze-up, overheat, deposit particles or condensate on sensing elements of such sensors.

BACKGROUND OF THE INVENTION

Flow sensors are utilized in a variety of fluid-sensing applications for detecting the quality of fluids, including gas and liquid. Thermal sensors of such fluids, which detect the fluid flow or property of fluid, can be implemented, for example, as sensors on silicon in microstructure form. For convenience sake, and without limitation, the term "flow sensor" will be utilized generically hereinafter for such thermal sensors. The reader will appreciate that such sensors may be also utilized to measure primary properties such as temperature, thermal conductivity, specific heat and other properties; and that the flows may be generated through forced or natural convection.

Generally, a thermal-type flow sensor typically comprises a substrate that includes a heating element and a proximate heat-receiving element or two. If two such sensing elements are used, they are preferably positioned at upstream and downstream sides of the heating element relative to the direction of the fluid (liquid or gas) flow to be measured. When fluid flows along the substrate, it is heated by the heating element at the upstream side and the heat is then transferred non-symmetrically to the heat-receiving elements on either side of the heating element. Since the level of non-symmetry depends on the rate of gas flow, and that non-symmetry can be sensed electronically, such a flow sensor can be used to determine the rate and the cumulative amount of the fluid flow.

Such flow sensors generally face potential degradation problems when exposed to harsh (contaminated, dirty, condensing, etc.) fluids, including gases or liquids that can "stress" the sensor via corrosion, radioactive or bacterial contamination, overheating, or freeze-ups. The sensitive measurement of the flow, or pressure (differential or absolute) of "harsh" gases or liquids that can stress corrode, freeze-up, or overheat the sensing elements is a challenge that is either unmet or met at great expense. Among the solutions proposed previously are passivation with the associated desensitization of the sensor, heaters to avoid condensation or freeze-ups (or coolers to prevent overheating) at the expense of sensor signal degradation, cost increase and possible fluid degradation, or filters to remove objectionable particulate matter. Frequent cleaning or replacement of the sensors is an additional, but costly, solution. Sensitive, membrane-based differential pressure sensors can be protected against contamination because no flow is involved, but they are much less sensitive and much more expensive than thermal microsensors, in addition to not being overpressure proof.

The present inventors thus realize that a need exists for a method and system to prevent "stressing" flow sensors exposed to harsh fluids or gases. The present invention disclosed herein solves this need through the implementation of a unique purge flow method to counteract corrosive and degrading effects of harsh fluids to which flow sensors are exposed during fluid diagnosis and sensing applications.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is one aspect of the present invention to provide a method and systems for preventing the contamination of sensors and microsensors.

It is another aspect of the present invention to provide methods and systems for preventing the contamination of sensors and microsensors that function in combination with one or more differential pressure sensors.

It is still another aspect of the present invention to provide methods and systems for preventing the contamination of sensors which may come into contact with harsh gases or liquids that can stress (via corrosion, radioactive or bacterial contamination, overheating, freeze-up, deposition of particles or condensation, etc.) of sensing elements of such sensors.

It is yet another aspect of the present invention to provide methods and systems for preventing the contamination of sensors which may come into contact with harsh fluids by providing an imposed purge flow or auxiliary fluid stream in opposition to the flow of the harsh fluid.

The above and other aspects are achieved as is now described. The present invention discloses methods and systems utilizing a purge flow without disturbing flow sensor calibration. Methods and systems are disclosed for preventing contamination of a sensor exposed to a harsh fluid as a result of fluid flow through a bypass channel integrated with a main channel and a restricted portion thereof. The harsh fluid is generally conducted through a main channel and a restricted portion thereof, wherein a portion of the harsh fluid may come into contact with the sensor through the bypass channel. An auxiliary flow of comparatively clean fluid (clean fluid, purge flow, auxiliary fluid or purge fluid may be used interchangeably herein) that is compatible with a composition of the harsh fluid is thus introduced, such that the clean fluid flows past the sensor in opposition to the harsh fluid, thereby preventing the harsh fluid from contacting and degrading the sensor. The auxiliary flow of clean fluid can be configured to comprise an auxiliary purge stream to prevent contamination of the sensor.

The comparatively clean or purge fluid itself may comprise a purge liquid or gas, such as clean, dry air that is compatible with the composition of the harsh fluid. The flow and pressure of the clean fluid can be adjusted utilizing one or more supply regulator valves. The auxiliary flow of clean fluid is generally applied to flow past the sensor in opposition to the harsh fluid, such that the clean fluid flows symmetrically. The sensor itself preferably is composed of one or more thermal microsensors or one or more differential pressure microsensors. Thus, by introducing an auxiliary flow of clean fluid compatible with the composition of the harsh fluid, such that the clean fluid flows past the sensor in opposition to the harsh fluid, the harsh fluid can be prevented from contacting and degrading the sensor through corrosion, radioactive or bacterial contamination, overheating, freeze-up, particle deposition or condensation thereof, or other manners in which the sensor operation is impeded.

The present invention discloses a number of novel features for preventing contamination of sensors exposed to harsh fluids. The use of an auxiliary purge stream to prevent contamination of sensitive flow sensors through corrosion, radioactive or bacterial contamination, overheating, freeze-up, condensation, and particulate matter deposition is a primary feature of the present invention. The use of a symmetric purge stream on two legs of a bypass flow sensor so that that the sensor is able to respond to by-directional flow is also a feature of the present invention. The present invention also discloses the ability to convert an unidirectional sensor to a bi-directional sensor by adding a non-symmetrical flow bias to its ports. Additionally, the use of an auxiliary purge stream to prevent contamination of sensitive flow-based differential sensors is also disclosed herein. The present invention also features the use of an auxiliary purge stream to enable the sensitive measurement of small changes in absolute pressure (differential pressures can be sensed as well), in addition to preventing contamination of the sensitive flow sensor.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate an embodiment of the present invention and are not intended to limit the scope of the invention.

The present invention discloses a number of novel features for preventing contamination of sensors exposed to harsh fluids. The use of an auxiliary purge stream to prevent contamination of sensitive flow sensors through corrosion, radioactive or bacterial contamination, overheating, freeze-up, condensation, and particulate matter deposition is a primary feature of the present invention. The use of a symmetric purge stream on the legs of a bypass flow sensor so that that the sensor is able to respond to bi-directional flow is also a feature of the present invention. The present invention also discloses the ability to convert an unidirectional sensor to a bi-directional sensor by adding a non-symmetrical flow bias to its ports. Additionally, the use of an auxiliary purge stream to prevent contamination of sensitive flow-based differential sensors is also disclosed herein. The present invention also features the use of an auxiliary purge stream to enable the sensitive measurement of small changes in absolute pressure, in addition to preventing contamination of the sensitive flow sensor.

Figure 1:
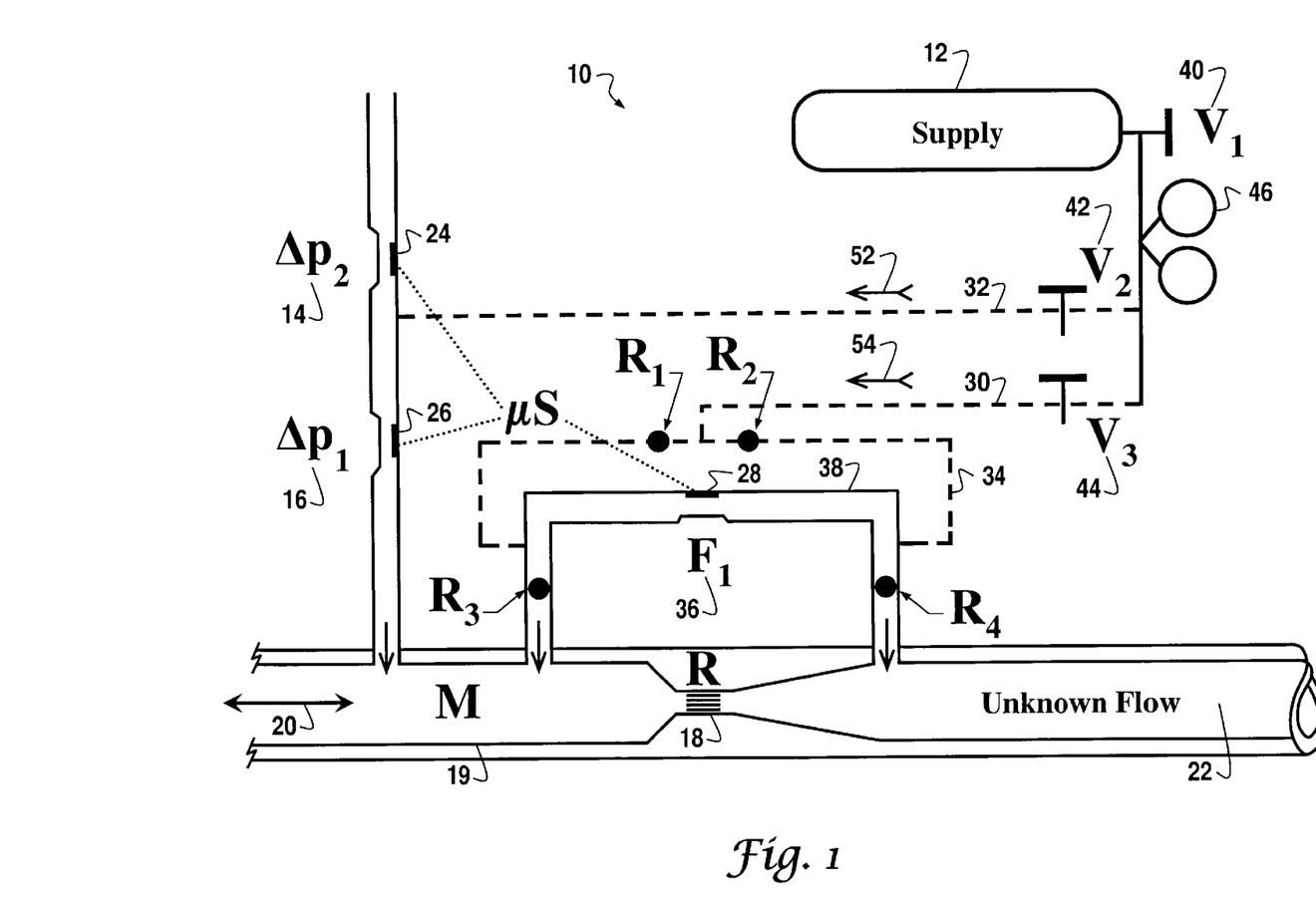
FIG. 1 illustrates a schematic diagram of a flow sensor involving harsh fluids, in accordance with a preferred embodiment of the present invention.

By implementing the present invention in the context of flow sensor applications, a number of advantages are realized. The flow-based sensor configuration illustrated herein, specifically with reference to FIG. 1, presents several advantages of differential pressure membrane sensor approaches, including lower cost, a wider flow range, longer and more reliable service life, increased sensitivity of the sensor itself, lack of the force exerted by present-day steel membranes utilized to contain a buffer liquid, such as, for example, silicone oil and a lower flow restriction. Additionally, a heater or heater line is no longer required to avoid condensation at the sensor element.

FIG. 1 illustrates a schematic diagram 10 of a flow sensor approach involving harsh fluids, in accordance with a preferred embodiment of the present invention. The present invention discloses a method and system for preventing contamination of a sensor exposed to a "harsh" fluid, such as harsh gases or liquids, which can corrode, freeze-up, overheat, deposit particles or condensate on the sensing elements of a flow sensor or otherwise impede the operation of the flow sensor. Note that as utilized herein, the term "fluid" can refer to either a gas or a liquid. The present invention utilizes an auxiliary fluid stream or purge flow, such that the fluid is compatible with the composition of the main flow of "harsh" fluid. This auxiliary fluid stream or purge flow of clean fluid biases the to-be-biased flow or differential pressure, such that the harsh fluid cannot reach the flow sensor. The auxiliary bias stream is thus capable of transmitting small pressure signals representing the variables that need to be measured, or causes a replication of the desired flow signals.

The present invention employs a biasing approach in which one or more flow or pressure sensors are biased via imposed or auxiliary flows of a comparatively "clean" fluid past the flow sensor, thus blocking access to the sensor by harsh fluids. Flow and pressure sensors share the need for physical contact with the fluid to be sensed and, therefore, both share in the benefit of the solutions described here.

Referring to FIG. 1, there is shown a representative a flow and pressure sensing application, that includes a flow sensor 36 and differential pressure sensors 14 and 16, along with sensitive but contamination-susceptible microsensors 24, 26 and 28 (which can be placed in other locations other than as shown in FIG. 1). In FIG. 1 flow sensor 36 is indicated as "$F_1$" and differential pressure sensors 16 and 14 are indicated respectively by "$\Delta p_1$" and "$\Delta p_2$". Additionally, microsensors 24, 26 and 28 are indicated by "$\mu S$". Note than an example of a microsensor that is suitable for use in association with the present invention is generally described in FIG. 5 and the discussion thereof.

Referring to FIG. 1, as a main flow 20 passes through a main channel 19 and a restriction 18 (i.e., a restriction channel), a small fraction of the main fluid (e.g., for example, approximately 0.1% to 5% in a particular sensing application of assignee) is forced into a bypass 38 and past microsensor 28 of flow sensor 36. This can generate a signal, positive or negative, depending on the sense of main flow 20. Note that in FIG. 1 main flow 20 is also represented by "M" and restriction 18 is also represented by "R". Restriction 18 can be of any design, such as an orifice, Venturi, honeycomb, laminar flow element, or the like. An unknown flow 22 is conducted through main channel 19 after passing through restriction 18. An example of a differential pressure sensor, which is suitable for use in association with the present invention is available from Honeywell in Freeport, Ill., and is listed as "20PC" in the Honeywell S&C Catalog No. 15 and also in co-owned U.S. Pat. No. 5,684,253 by Bonne et al., which are both herein incorporated by reference.

If the flow, M, includes corrosive, radioactive, condensable, high-temperature, precipitable or particulate matter laden fluid, some of this material or fluid would eventually corrode, contaminate, precipitate on, overheat, deposit, and/or stick to the sensing surfaces of the microsensor 36 (F1), despite a preferred "face down" installation of the microsensor. To eliminate the risk to sensor life and reliability, a small stream of clean fluid is injected or introduced via the ducts 30, 32 and 34 (illustrated as dashed lines in FIG. 1). (Note that as utilized herein, the term "duct" may be utilized interchangeably with the term "channel".) The flow and pressure of this purge fluid from (air or gas or other fluid) supply 12 can be adjusted via supply regulator valves 40, 42, and 44 (also shown as V1, V2, and V3, respectively) to suffice for opposing the largest flow of fluid from M, which would otherwise normally drive fluid flow past microsensors 24, 26 and 28. Note that if required for the control of corrosive process-stream fluids, check valves can be added, as indicated by the arrows 52 and 54 in FIG. 1 to positively prevent undesirable flows, even in the case of process upsets.

The flow sensor 36 does not need to be recalibrated as a result of the introduction of the auxiliary streams of "clean" or purge fluid 30, 32, and 34. Additionally, the purge flows 30 and 34 do not need to be steady or known, as long as the purge fluid is applied symmetrically with a sufficiently low flow rate, relative to the main flow 20, so that its contribution to flow 20 can be viewed as negligible. For the pressure sensing application, however, the purge flow generally does need to be constant. The purge gas stream can simply be clean, dry air for the measurement of flow rates of, for example, exhaling in medical applications. For example, the purge gas stream can also be utilized for measurement of air saturated with gasoline-vapors in refueling operations. In another example, the purge gas stream of the present invention can be utilized to prevent contamination of toxic gas microsensors that indicate the presence of a toxic gas or objectionable constituents of combustion products. In general, the purge fluid stream of the present invention can be utilized to measure main flows of "harsh" fluids. Preferably, the purge and main flow fluids would be of the same phase (gas or liquid), but that is not absolutely necessary: In addition, a gaseous purge fluid can be used to measure a main flow of liquid.

The differential pressure sensors 24 and 26 illustrated in FIG. 1 are generally biased in such a manner that may influence their calibration, unless they are operating in a linear-differential-pressure-versus-flow regime. Differential pressure sensor 14 can be replaced, for example, by a restriction, so that incoming purge gas (i.e., "clean" fluid) can be evenly distributed at a "T" junction. As illustrated in FIG. 1, both differential pressure sensors, 14 and 16, can serve as bi-directional, contamination-protected differential pressure sensors. By closing an open port above differential pressure sensor 14, the differential pressure sensor 16 can function as a sensitive monitor of absolute pressure changes, relative to the pressure level set by one or more of the fluid supply regulators 40, 42, or 44. An absolute pressure increase of M is indicated by a decrease in the flow-through and signal of differential pressure sensor 16. Also illustrated in FIG. 1 are restrictions $R_3$ and $R_4$. The flow that occurs at $R_3$, for example, may be balanced constantly, passively, and accurately to essentially be zero utilizing a "zero governor" or can simply be a very small flow, below an allowed error of $F_1$. The present invention described herein can thus be implemented to prevent contamination of flow sensors, including microsensors thereof, such as microsensors 24, 26 and 28 (of flow sensor 36), as illustrated in FIG. 1.

In order for the present invention to optimally operate in association with flow sensors, such as the flow sensor 36 illustrated in FIG. 1, several conditions should be met. The pressure drops at $R_3$ and $R_4$ should be small compared to the restriction indicated at 36 ($F_1$). The following equation 1 generally describes this condition:

$$\Delta p(R_2, R_3) << \Delta p(F_1) \quad \text{(Eq. 1)}$$

Such a formulation will generally ensure that the small asymmetries that may be present in the connecting tubing between $R_3$ and $R_4$ do not give rise to noticeable offsets of flow at sensor 36 (or $F_1$).

Additionally, the pressure drop at $F_1$ should be generally negligible compared to the restriction at $R_1$ when combined with $R_2$ ($R_1$ plus $R_2$), as illustrated by equation 2:

$$\Delta p(F_1) << \Delta p(R_1 + R_2) \quad \text{(Eq. 2)}$$

This guarantees that only a minimum amount of purge gas and gas pressure are used to prevent "contamination" of $F_1$ by "harsh" fluid from the main flow channel 19. The path through $R_1$ and $R_2$ is a potential shunt to $F_1$; however, it is not active as long as a "desired" purge flow is maintained at $R_2$ and $R_4$, which this second condition supports.

Note that in an alternative embodiment or variation of FIG. 1, the differential pressure sensors 14 and 16 can be considered as replacements of flow sensor 36, which would eliminate the need for flow sensor 36 in those cases where its wide dynamic range and pressure independence are not important as will be apparent to those skilled in the art. Buffer fluids maintained between the sensitive sensor membrane of the differential pressure sensors 14 and 16 and the harsh fluid that flow through flow 20 can be typically achieved utilizing silicone liquids held between a stainless steel membrane in contact with the "harsh" fluid and the differential pressure sensor membrane. However, the steel membrane adds an undesirable spring-element to the force of the fluid pressure, in accordance with varying embodiments of the present invention.

Figure 2:
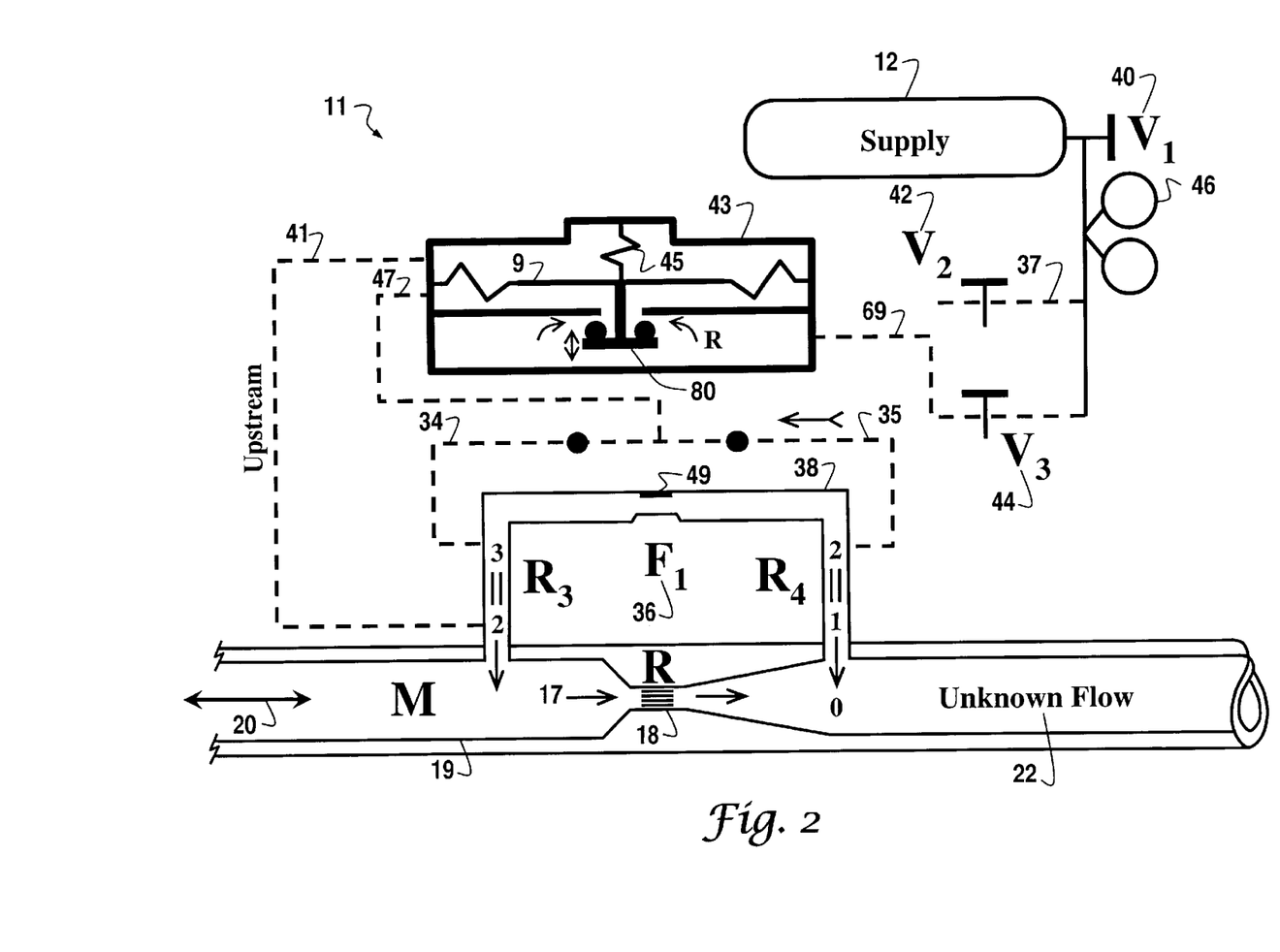
FIG. 2 depicts an alternative schematic diagram of a flow sensor involving harsh fluids in which bi-directional flow is represented, in accordance with an alternative embodiment of the present invention.

FIG. 2 depicts an alternative schematic diagram 11 of a flow sensor approach involving harsh fluids in which bi-directional flow is represented, in accordance with an alternative embodiment of the present invention. Note that in FIGS. 1 to 4, analogous parts or elements are generally indicated by identical reference numerals. Thus, as illustrated in FIG. 2, microsensor 49 is part of flow sensor 36 (indicated as "$F_1$"). Ducts 34, 35, and 47 are linked to fluid supply regulators 43, 44, 46 and 40 which in turn are connected to supply 12. Additionally, a duct 37 is linked specifically to fluid supply regulator 42, while duct 69 is specifically connected to fluid supply regulator 44. Point 3 of restriction $R_3$ is linked to duct 47, while point 2 of restriction $R_3$ is linked to duct 41. Ducts 41, 47 and 69 are also connected to pressure regulator 43.

Pressure regulator 43 maintains a minimum and a constant (within a 30 small error range) pressure drop between point 3 and point 3 of $R_3$ to guarantee the operation of the intended purge function. Channel 41 is preferably always linked to the upstream leg, labeled in FIG. 2 as UPSTREAM. If the pressure in duct 47 rises to a value that is greater than its set value above the pressure in duct 41 (and fluid flow 20), an associated regulator membrane 9 under the spring 45 moves to increase the flow restriction at R, and vice-versa, thus restoring the above pressure drop. Such a membrane 9 is shown within pressure regulator 43, along with a spring 45. The schematic diagram 11 depicted in FIG. 2 thus illustrates an alternative flow sensing approach in which a minimum amount of purge gas can be utilized.

Figure 3:
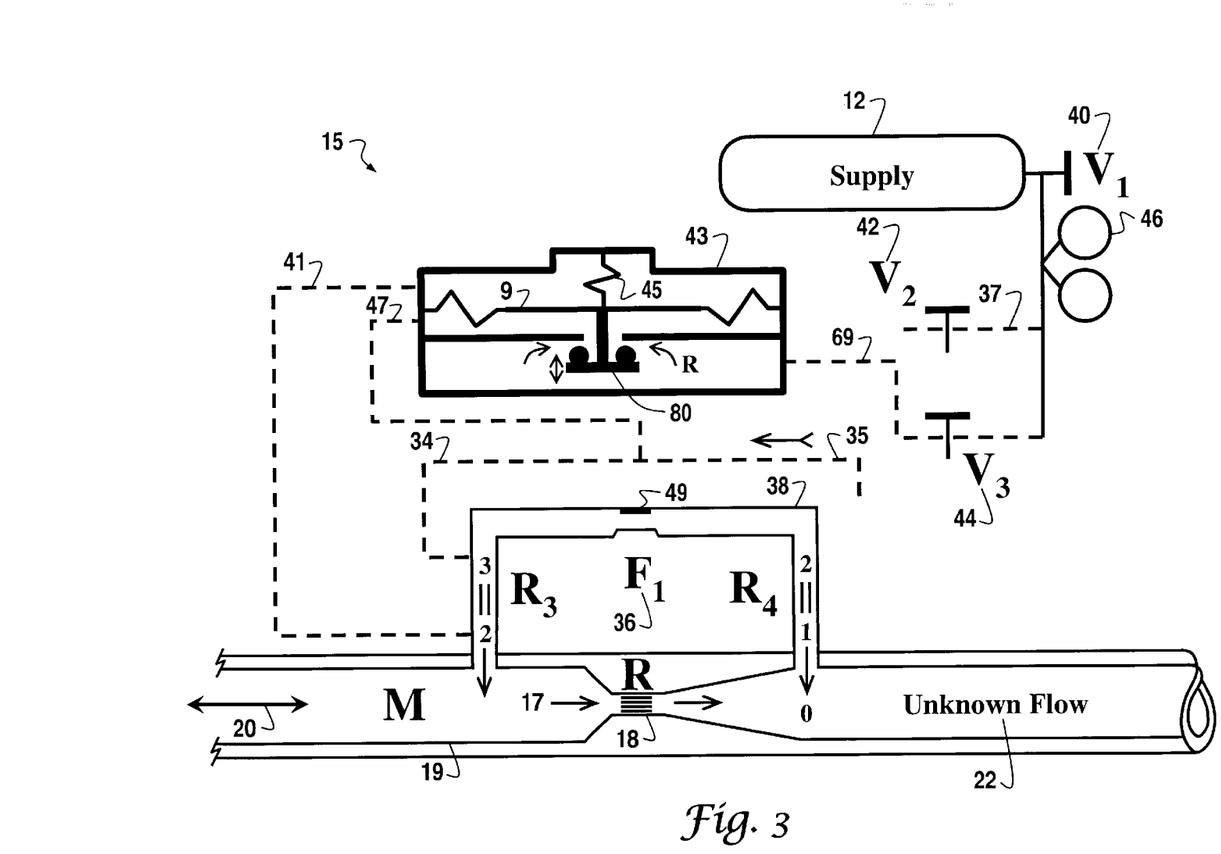
FIG. 3 depicts an alternative schematic diagram of a flow sensor involving harsh fluids in which unidirectional flow is represented, in accordance with an alternative embodiment of the present invention.

FIG. 3 depicts an alternative schematic diagram 11 of a flow sensor approach involving harsh fluids in which unidirectional flow is represented, in accordance with an alternative embodiment of the present invention. As illustrated in FIG. 3, ducts 69 and 37 are linked to fluid supply regulators 44 and 42, respectively, which in turn are connected to supply 12 of air or gas. Ducts 34 and 35 are linked to duct 47, which in turn is connected to pressure regulator 43. Restriction $R_3$ is linked to duct 34 at point 3, while restriction $R_3$ is linked to duct 41 at point 2. Ducts 41, 47 and 69 are also connected to a pressure regulator 43. Pressure regulator 43 maintains a minimum and relatively constant pressure drop across $R_3$ to guarantee the operation of the intended purge function. Because unidirectional flow is represented in FIG. 3, channel or duct 35 is disconnected, along with the restrictions indicated in FIG. 2, but a price is paid in the form of a flow signal bias at zero main flow, which is not true for the configuration depicted in FIG. 2. Additionally, note that in both FIGS. 2 and 3, arrows are illustrated at valve 80 of pressure regulator 43 to indicate the regulatory movement of valve 80.

Figure 4:
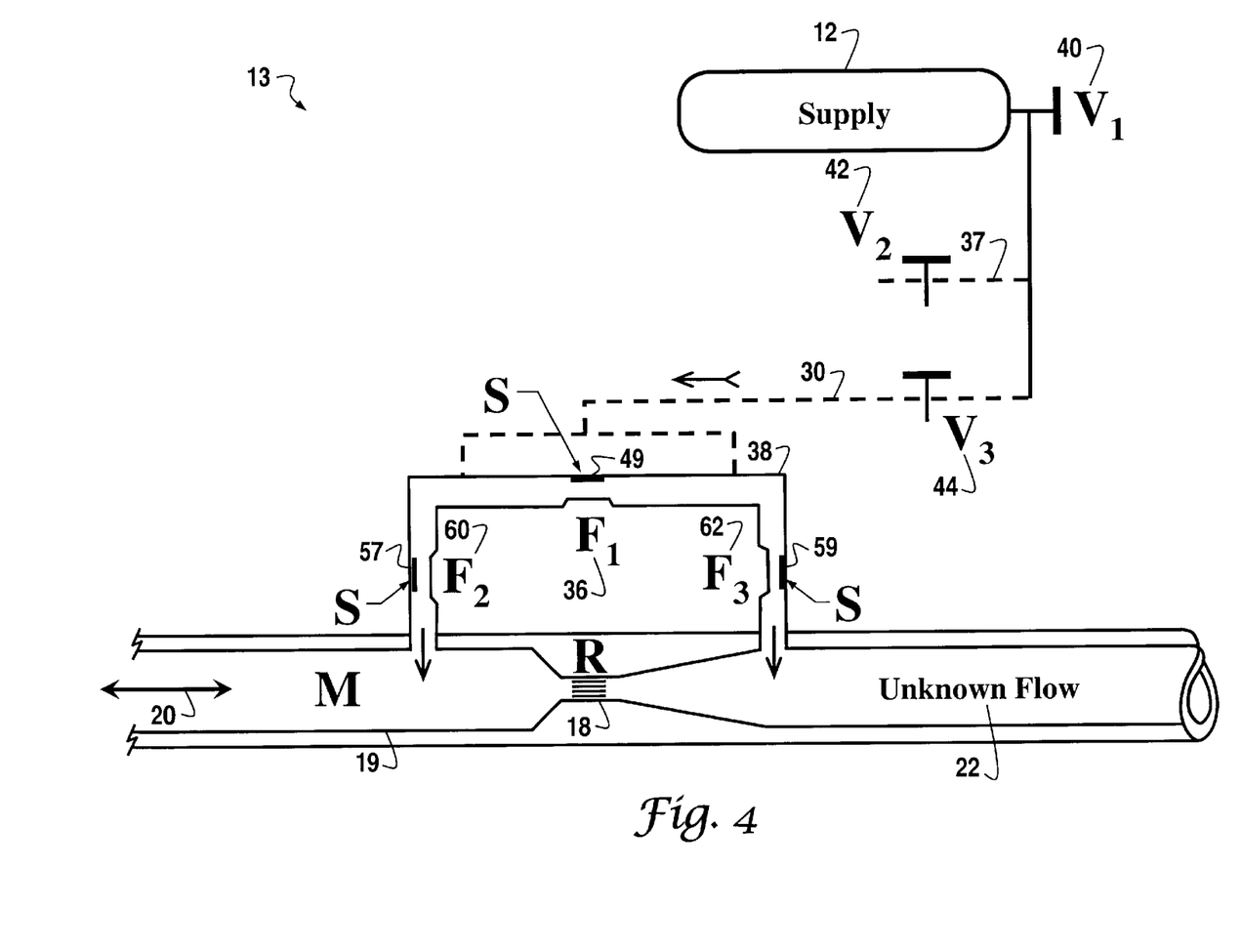
FIG. 4 illustrates an alternative schematic diagram of a flow sensor involving harsh fluids, in accordance with an alternative embodiment of the present invention.

FIG. 4 illustrates an alternative schematic diagram 13 of a flow sensor approach involving harsh fluids, in accordance with an alternative embodiment of the present invention. Again, note that in FIGS. 1 through 4, analogous parts or elements are generally indicated by identical reference numerals. In the configuration illustrated in FIG. 4, a plurality of flow sensors 60, 36 and 62 are respectively associated with a plurality of microsensors 57, 49, and 59. The configuration illustrated in FIG. 4 thus differs from the configurations illustrated in FIGS. 1 through 3 in that two additional flow sensors are provided to control the purge function. Additionally, the output difference between flow sensors 60 and 62 (i.e., $F_2$ and $F_3$, respectively) can replace the output of flow sensor 36 (i.e., $F_1$). Additionally, in the configuration of FIG. 4, an electronic control of pressure at $V_3$ (44) can be implemented to hold upstream flow sensor 60 or 62 at essentially "zero flow."

Microsensors 57, 49, and 59 thus are associated respectively with flow sensors 60, 36, and 62. Providing purge flow is advantageous to ensure both protection of the sensors against harsh fluids such as those carrying bacterial/viral infection agents (e.g., in medical applications utilizing the present invention) without replacing or cleaning sensors $F_2$ or $F_3$, which are illustrated in FIG. 4. To prevent violation of the condition set forth via equation 1 above, $F_2$ and $F_3$ can be installed at locations upstream from the restrictions shown at that location in FIG. 1. Additionally, a mass controller can be utilized to assist in minimizing purge gas consumption by ensuring that $F_2$ is as small as possible, but positive, and small relative to $F_1$. This arrangement ensures that only the minimally needed purge gas flows out of the upstream (relative to main flow M) sensor $F_2$, while the output of sensor $F_1$, corresponding to the sum of flows $M+F_2$, can be approximated by M.

Figure 5:
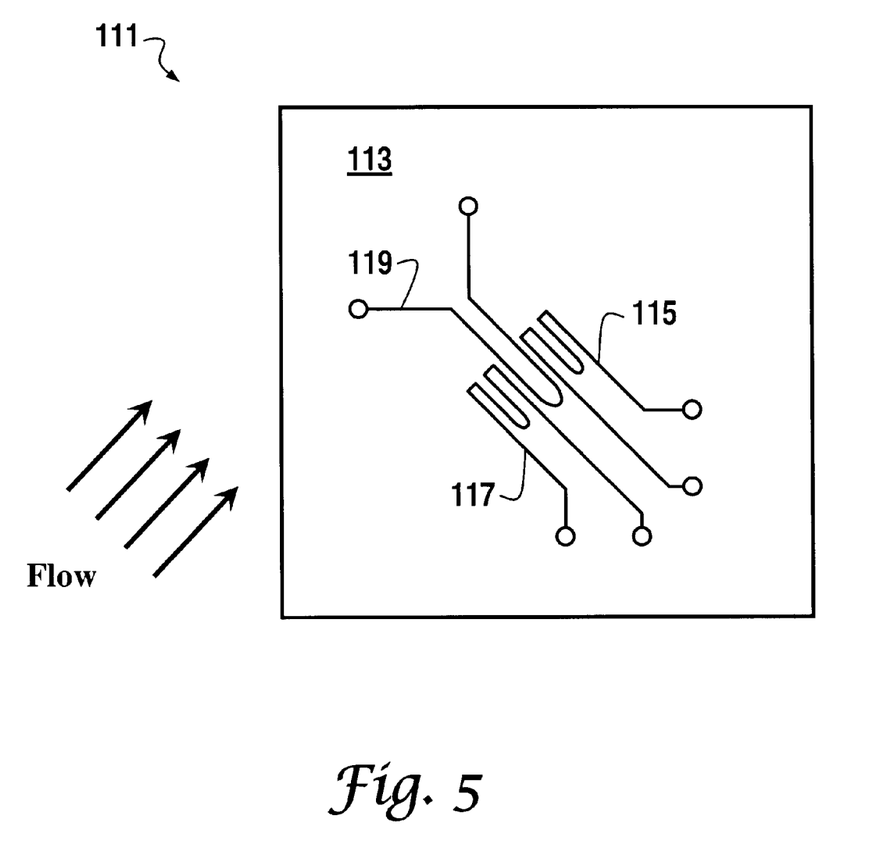
FIG. 5 depicts an illustrative example of a sensor that can be protected from harsh environments, illustrating a top view of a silicon microsensor die showing micro membrane heating and sensing elements, which may be utilized in association with preferred or alternative embodiments of the present invention.

FIG. 5 depicts an illustrative example of a sensor that can be protected from harsh environments. FIG. 5 illustrates a top view of a silicon flow microsensor die showing micro membrane heating and sensing elements that may be utilized in association with preferred or alternative embodiments of the present invention. Referencing FIG. 5, a fluid flow sensor 111 is implemented on a silicon substrate or body 113. Onto the silicon substrate 113 are placed sensor elements 115, 117 surrounding a central heating element 119 composed of a suitable metal, such as platinum. The arrangement and theory of operation for a microstructure fluid flow sensor of this type is known to those in the art and will not further be elaborated on herein. Mass Air Flow Sensors that are available from Honeywell, Cat. Nos. AWM2000-5000, are suitable microstructure sensors. Additional information regarding such a microstructure fluid flow sensor is found in U.S. Pat. No. 6,184,773, by U. Bonne and A. Padmanabhan, entitled "Rugged Fluid Flow and Property Microsensor;" and U.S. Pat. 6,184,773, Feb. 6, 2001, assigned to Honeywell, which is incorporated by reference.

The present invention is particularly useful in medical applications requiring the use of a flow sensor. For example, flow sensors have been adapted for use in the automatic delivery of aerosolized compounds and medications for inspiration by patients. By preventing contamination of such flow sensors, according to the methods and systems of the present invention herein, such medical-application flow sensors experience a longer operating life, in addition to increased sensitivity, which is extremely important in the accurate and automatic delivery of particular medications to patients. Thus, the present invention can solve problems associated with sensing patients' inhaling and exhaling breath flow rate despite condensation. Additional medical applications in which flow sensors are utilized include medication infusion pumps for use in delivering a selected medication to a patient in a scheduled or preprogrammed manner. Such devices can be incorporated with a compact flow sensor for monitoring and verifying medication outflow in response to pump operation. Preventing contamination of such sensors thus saves decontamination costs and energy through implementation of the methods and system of the present invention described herein.

Methods and systems are thus disclosed herein for preventing contamination of a sensor exposed to a harsh fluid as a result of fluid flow through a bypass channel integrated with a main channel and a restricted portion thereof. The harsh fluid is generally conducted through the main channel and the restricted portion thereof, wherein a portion of the harsh fluid would have come into contact with the sensor through the bypass channel. An auxiliary flow of comparatively clean fluid compatible with a composition of the harsh fluid is thus introduced, such that the clean fluid flows past the sensor in opposition to the harsh fluid, thereby preventing the harsh fluid from contacting and degrading the sensor. The auxiliary flow of clean fluid can be configured to comprise an auxiliary purge stream to prevent contamination of the sensor.

The purge fluid itself may comprise a purge liquid or gas, such as clean, dry air and dry nitrogen that is compatible with the composition of the harsh fluid. The flow and pressure of the clean fluid can be adjusted utilizing one or more supply regulator valves. The auxiliary flow of clean fluid is generally applied to flow past the sensor in opposition to the harsh fluid, such that the clean fluid flows symmetrically. The sensor itself is preferably a flow sensor, which can be a microsensor. Such a flow sensor can be implemented in a configuration that includes one or more differential pressure sensors. Thus, by introducing an auxiliary flow of comparatively clean fluid compatible with the composition of the harsh fluid, such that the clean fluid flows past the sensor in opposition to the harsh fluid, the harsh fluid can be prevented from contacting and degrading the sensor through corrosion, radioactive or bacterial contamination, overheating, freeze-up, particle deposition or condensation thereof.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

Having thus described the invention, the embodiments of the invention in which an exclusive property or right is claimed are defined below and what is claimed is:

1. A method for preventing contamination of a sensor exposed to a harsh fluid as a result of fluid flow through a bypass channel integrated with a main channel and a restricted portion thereof, said method comprising the steps of:

conducting said harsh fluid through said main channel and said restricted portion thereof, wherein a portion of said harsh fluid contacts said sensor through said bypass channel; and introducing an auxiliary flow of a purge fluid, wherein said purge fluid is compatible with a composition of said harsh fluid such that said purge fluid flows past said sensor in opposition to said harsh fluid, thereby preventing said harsh fluid from contacting and degrading said sensor.

2. The method of claim 1 further comprising the step of:
configuring said auxiliary flow of purge fluid to comprise an auxiliary purge stream to prevent contamination of said sensor.

3. The method of claim 1 wherein said purge fluid comprises a purge gas compatible with said composition of said harsh fluid.

4. The method of claim 1 further comprising the step of:
adjusting said auxiliary flow of said purge fluid utilizing at least one regulator valve.

5. The method of claim 1 further comprising the step of:
adjusting a pressure associated with said flow of said purge fluid utilizing at least one regulator valve.

6. The method of claim 1 further comprising the step of:
applying said auxiliary flow of said purge fluid to flow past said sensor in opposition to said harsh fluid, such that said purge fluid flows symmetrically.

7. The method of claim 1 wherein said sensor comprises a flow sensor.

8. The method of claim 1 wherein said sensor comprises a microsensor.

9. The method of claim 1 further comprising the step of:
configuring said sensor as a unidirectional sensor; and
thereafter converting said unidirectional sensor to a bi-directional sensor by adding a non-symmetrical flow bias to a plurality of associated ports.

10. A method for preventing contamination of a flow sensor exposed to a harsh fluid as a result of fluid flow through a bypass channel integrated with a main channel and a restricted portion thereof, said method comprising the steps of:

conducting said harsh fluid through said main channel and said restricted portion thereof, wherein a portion of said harsh fluid contacts said flow sensor through said bypass channel;

introducing a stream of purge gas compatible with a composition of said harsh fluid such that said purge gas flows past said sensor in opposition to said harsh fluid; and adjusting a flow and pressure of said purge gas utilizing at least one regulator valve, thereby preventing said harsh fluid from contacting and degrading said flow sensor.

11. A method for preventing contamination of a flow sensor exposed to a harsh fluid as a result of fluid flow through a bypass channel integrated with a main channel and a restricted portion thereof, said method comprising the steps of:

conducting said harsh fluid through said main channel and said restricted portion thereof, wherein a portion of said harsh fluid comes into contact with said flow sensor through said bypass channel;

introducing a stream of purge gas compatible with a composition of said harsh fluid such that said purge gas flows past said sensor in opposition to said harsh fluid;

applying said stream of purge gas to flows symmetrically; and adjusting a flow and pressure of said purge gas utilizing at least one regulator valve, thereby preventing said harsh fluid from contacting and degrading said flow sensor.

12. A system for preventing contamination of a sensor exposed to a harsh fluid as a result of fluid flow through a bypass channel integrated with a main channel and a restricted portion thereof, said system comprising:

said harsh fluid conducted through said main channel and said restricted portion thereof, wherein a portion of said harsh fluid comes into contact with said sensor through said bypass channel; and an auxiliary flow of purge fluid that is compatible with a composition of said harsh fluid such that said purge fluid flows past said sensor in opposition to said harsh fluid, thereby preventing said harsh fluid from contacting and degrading said sensor.

13. The system of claim 12 wherein said auxiliary flow of purge fluid comprises an auxiliary purge stream to prevent contamination of said sensor.

14. The system of claim 12 wherein said purge fluid comprises a purge gas compatible with said composition of said harsh fluid.

15. The system of claim 12 wherein said auxiliary flow of purge fluid is adjustable utilizing at least one regulator valve.

16. The system of claim 12 wherein a pressure associated with said flow of purge fluid is adjustable utilizing at least one regulator valve.

17. The system of claim 12 wherein said auxiliary flow of purge fluid is introduced to flow past said sensor in opposition to said harsh fluid, such that said purge fluid flows symmetrically.

18. The system of claim 12 wherein said sensor comprises a flow sensor.

19. The system of claim 12 wherein said sensor comprises a microsensor.

20. The system of claim 12 wherein said sensor comprises a unidirectional sensor convertible to a bi-directional sensor by adding a non-symmetrical flow bias to associated ports.

21. A system for preventing contamination of a flow sensor exposed to a harsh fluid as a result of fluid flow through a bypass channel integrated with a main channel and a restricted portion thereof, said system comprising:

- said harsh fluid conducted through said main channel and said restricted portion thereof, wherein a portion of said harsh fluid comes into contact with said flow sensor through said bypass channel;
- a stream of purge gas compatible with a composition of said harsh fluid wherein said purge gas flows past said sensor in opposition to said harsh fluid; and
- wherein a flow and pressure of said purge gas is adjustable utilizing at least one regulator valve, thereby preventing said harsh fluid from contacting and degrading said flow sensor.

22. A system for preventing contamination of a microsensor exposed to a harsh fluid as a result of fluid flow through a bypass channel integrated with a main channel and a restricted portion thereof, said system comprising:

- said harsh fluid conducted through said main channel and said restricted portion thereof, wherein a portion of said harsh fluid comes into contact with said microsensor through said bypass channel;
- a stream of purge gas compatible with a composition of said harsh fluid wherein said purge gas flows symmetrically past said sensor in opposition to said harsh fluid; and
- wherein a flow and pressure of said purge gas is adjustable utilizing at least one regulator valve, thereby preventing said harsh fluid from contacting and degrading said microsensor.

* * * * *